INVENTORS
Duane K. Dye &
BY Robert P. Rohde
W. S. Pettigrew
ATTORNEY

_United States Patent Office_

3,301,011
Patented Jan. 31, 1967

3,301,011
STEERING SHAFT ISOLATION COUPLING
Duane K. Dye and Robert P. Rohde, Saginaw, Mich., assignors to General Motors Corporation, Detroit, Mich., a corporation of Delaware
Filed Jan. 7, 1965, Ser. No. 423,973
2 Claims. (Cl. 64—27)

This invention relates to shaft couplings and more particularly to an improved isolation coupling for a vehicle steering or other drive shaft assembly.

The isolation coupling of this invention utilizes a metallic torsion rod for isolating torsional modes of vibration against transmission through the shafts between which the torsion rod is connected. Numerous advantages accrue from the use of such a metallic isolation member rather than the rubber or other elastomeric members normally used heretofore, such as closer control over material properties, lack of material set after prolonged use, resistance to deterioration, ease of manufacture, etc.

In accordance with the invention, a metallic torsion rod isolation member is operably connected between a pair of relatively movable steering shafts of a vehicle steering system in a manner to undergo substantial elastic twisting upon the application of torsional vibration to either steering shaft, thereby to dampen and isolate such vibration. A second flexible isolation member further interconnects the shafts to isolate other vibration modes and to accommodate limited relative movement between the shafts arising from road shocks or otherwise. Through proper employment of the torsion rod, it seeks to locate the steering shafts in a more or less centered or neutral relation, as during those frequent periods when no substantial shaft torque is required to steer the vehicle. During such periods, the torsion rod is free to twist and isolate torsional vibrations against transmission between the shafts. When it is necessary to apply a substantial amount of torque to steer the vehicle, a resulting predetermined limited degree of relative rotation between the shafts causes engagement of connectors provided thereon, so that driving association between the shafts is established.

The primary object of this invention is to provide an isolation coupling for a pair of relatively movable shafts and including metallic torsion rod means adapted to undergo substantial twisting upon the application of torsional vibration thereto, thereby to dampen such vibration.

This and other objects, features and advantages of the invention will be readily apparent from the following specification and drawings wherein.

Figure 1:
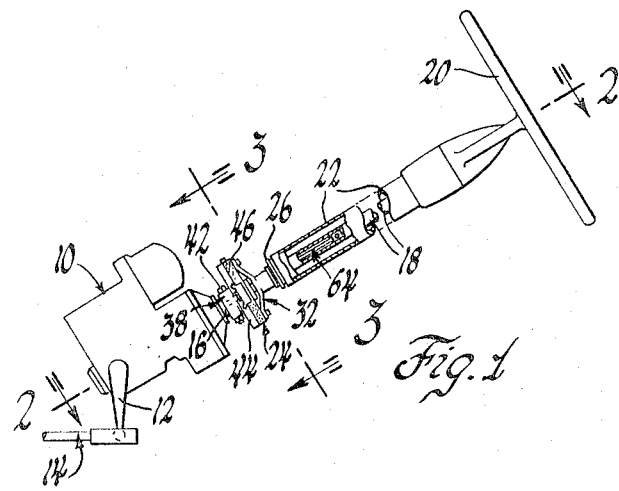
FIGURE 1 is a partially broken away elevational view of a vehicle steering system including an isolation coupling according to this invention.
Figure 2:
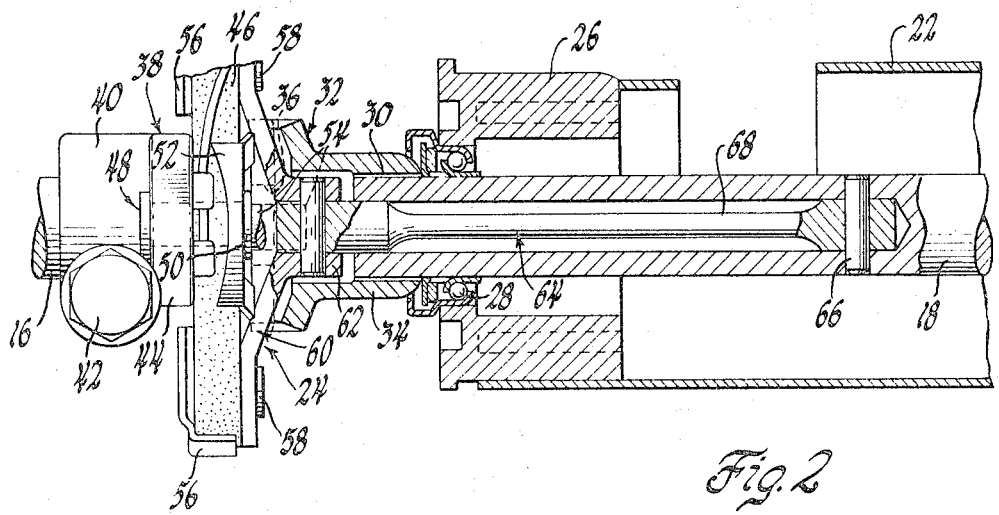
FIGURE 2 is an enlarged sectional view taken generally along the plane indicated by line 2—2 of FIGURE 1.

Referring now to FIGURE 1 of the drawings, there is shown a portion of a conventional vehicle power steering system including a power steering gear 10 having a pitman arm 12 operably connected to the steering linkage, indicated generally at 14, tied to the steered dirigible wheels of the vehicle. The input shaft 16 of steering gear 10, seen best in FIGURE 2, is adapted to be connected to a steering shaft 18 extending from adjacent the steering gear into the passenger compartment of the vehicle and carrying at its upper end a steering wheel 20. As is conventional, a mast jacket 22 surrounds the steering shaft, and as indicated in FIGURE 2, an opening may be provided at the lower end of the mast jacket to accommodate the lever system of a conventional transmission shifter tube assembly, not shown.

An isolation coupling, indicated generally at 24, is provided to drivingly connect the lower end of steering shaft 18 with the input shaft 16 of steering gear 10. Referring to FIGURE 2, a centrally bored adapter block 26 is received over the lower end of the steering shaft and suitably secured within the lower end of mast jacket 22. An antifriction ball-bearing assembly 28 is interposed between the adapter and steering shaft 18 to ensure relatively frictionless rotation of the shaft within the adapter. The lower extremity of the steering shaft 18 is splined at 30 and has received thereover a bored and similarly internally splined hub portion 34 of a drive member 32, also seen in FIGURE 3. The two laterally extending legs of member 32 are each provided with a semicircular cutout 36 for a purpose later to be described.

Turning to the input shaft 16 side of the coupling, such shaft at its upper extremity is splined in a manner not shown and receives thereover a bored and similarly internally splined hub portion 40 of a second or lower drive member 38. The hub 40 is partially axially slotted in a manner well-known in the art and is provided with a bolt 42 operable upon tightening thereof to clamp the hub over the input shaft 16 so as to retain drive member 38 securely thereon. As indicated in FIGURE 1, drive member 38 includes opposite laterally extending legs 44. A flexible coupling disc 46 of fabric or otherwise reinforced rubber or other elastomer is assembled on member 38 by means of a pair of pins 48 each received through aligned apertures in a leg 44 of member 38 and in the disc, the pins adjacent their right-hand end as viewed in FIGURE 2 being flanged at 50 to rest on one of a pair of retainer plates 52 and being headed over at their left-hand ends on member 38 to provide a relatively rigid assembly. Each pin 48 includes a connector extension 54 from the flange 50 received within a respective cutout 36 of member 32, seen best in FIGURE 3. Spaced quadrantally with respect to the plates 52 and at the opposite side of disc 46 therefrom are a pair of second retainer plates 56. An elongate coupling connector strap 60 is assembled against the right-hand side of the disc by means of a pair of headed pins or rivets 58 extending through the disc and each bearing at one end on a plate 56.

Figure 3:
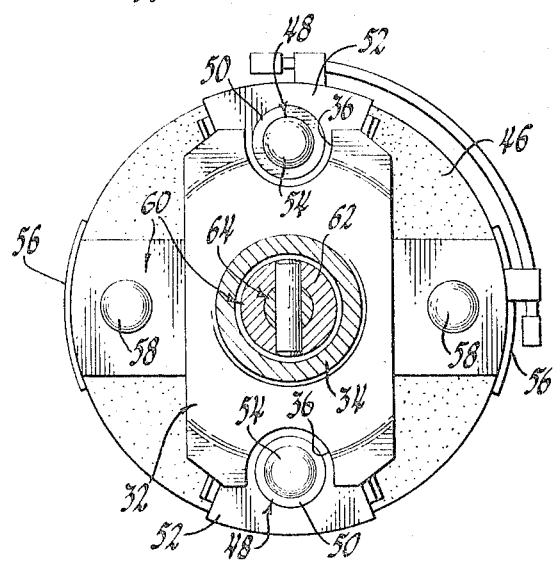
FIGURE 3 is an enlarged sectional view taken generally along the plane indicated by line 3—3 of FIGURE 1.

As seen best in FIGURE 2, connector 60 is formed with a centrally bored hub 62 projecting within the central bore of the hub 34 of member 32. Retained within the hub 62 by suitable pin means is one end of a metallic torsion rod 64 which extends upwardly through a central axial bore in the lower portion of steering shaft 18 and is nonrotatably retained at its upper end therewithin by a pin 66. The torsion rod is properly assembled to the steering shaft 18 and to the connector 60 in a substantially relaxed state and in such manner that member 32 is rotatively oriented with the steering shaft relative to connector extensions 54 in a centered or neutral relation as shown in FIGURE 3, whereby the extensions are generally concentrically oriented within the cutouts 36.

It is a characteristic of most known fluid power steering gears that the pulsations of the fluid pump supplying the gear result in substantial forced oscillations in the control valve segment of the gear, ultimately manifested as torsional vibrations structure-borne into the input shaft or similar component of the gear. By the isolation coupling of the present invention, such torsional vibrations will be directed from input shaft 16 through member 38 and into disc 46 whereupon, in only slightly reduced magnitude due to the substantial torsional rigidity of the disc, they are transmitted into connector 60. Assuming now that no appreciable steering torque is applied to steering wheel 20 to engage the member 32 with connector extensions 54, such torsional vibrations are consequently transmitted upwardly only through the torsion rod 64. The torsion rod is designed in practice to provide a substantially reduced diameter portion 68 which will respond to such torsional vibration with sufficient elastic twisting as to dampen all or substantially all of the energy of such vibrations prior to reaching steering shaft 18 through pin 66.

Further included in the criteria for designing torsion rod 64 are considerations of the amount of steering torque that must be transmitted through the torsion rod to actuate steering gear 10 under most power-assist steering conditions, such torque of course usually being determined by the spring or other centering forces employed within the control valve of the steering gear. In this way, maximum isolation benefits from the torsion rod are realized through precluding the necessity for any connection between member 32 and connector extensions 54 in order to steer the vehicle. It has been found in practice that through sizing the diameter and length of portion 68 for a twisting rate in the order of 9 inch-pound per degree, very satisfactory results are obtained.

It will of course be observed that disc 46 serves as additional isolation means in that any axial or bending modes of vibration emanating from input shaft 16 will be dampened through flexure of the disc. Further, the disc serves to accommodate any relative axial or other movement between the adjacent ends of the input and steering shafts arising from road shocks or otherwise.

In those fluid power failure or other conditions where appreciable steering torque must be applied through steering shaft 18 to actuate the steering gear, relative rotation in the order of a few degrees between the steering and input shafts causes engagement between member 32 and connector extensions 54 to establish the required rigid driving connection.

Thus a new and improved isolation coupling is provided.

We claim:

1. An isolation coupling for connecting a pair of relatively movable members, comprising, a flexible means connected between said relatively movable members, said flexible means being adapted to accommodate relative axial movement between said relatively movable members and to isolate axial and bending modes of vibration applied thereto, a metallic member connected between said relatively movable members, said metallic member permitting relative rotation between said relatively movable members and being so shaped as to undergo substantial elastic twisting upon the application of torsional vibrational energy to said relatively movable members, thereby to absorb said energy, and means for drivingly connecting said relatively movable members after a predetermined degree of relative movement therebetween.

2. An isolation coupling for connecting a pair of steering shafts, comprising, a first connecting member carried by one of said shafts, a second connecting member adapted for connection to the other of said shafts, a flexible isolation coupling member disposed intermediate said connecting members, said flexible member being adapted to accommodate relative axial movement between said shafts and to dampen axial and bending modes of vibration therein, means securing each of each connecting members to said flexible member, a torsion rod connected at one end thereof to said second connecting member and at the other end thereof to said other shaft, said torsion rod including a reduced diameter portion adapted to undergo substantial elastic twisting upon the application of torsional vibration energy to either of said shafts thereby to absorb said energy, said torsion rod in the untwisted state thereof locating said shafts in a rotative neutral relation, and means on said other shaft and on said first connecting member engageable upon relative rotation of said shafts from said neutral relation thereof to drivingly connect said shaft.

References Cited by the Examiner

UNITED STATES PATENTS

| 2,753,848 | 7/1956 | Burton | 64—13 X |
| 3,138,943 | 6/1964 | Gustke | 64—27 |

FOREIGN PATENTS 540,453  10/1941  Great Britain.

FRED C. MATTERN, JR., *Primary Examiner.*

HALL C. COE, *Examiner.*